(12) United States Patent
Challender et al.

(10) Patent No.: US 8,061,740 B2
(45) Date of Patent: Nov. 22, 2011

(54) BALL AND SOCKET COUPLING

(75) Inventors: Gary B. Challender, Grass Lake, MI (US); William T. Flynn, Horton, MI (US); Philip R. Morrison, Mason, MI (US)

(73) Assignee: Eaton Corporation, Cleveland, OH (US)

( * ) Notice: Subject to any disclaimer, the term of this patent is extended or adjusted under 35 U.S.C. 154(b) by 413 days.

(21) Appl. No.: 12/338,704

(22) Filed: Dec. 18, 2008

(65) Prior Publication Data

US 2010/0156096 A1    Jun. 24, 2010

(51) Int. Cl.
*F16L 27/04* (2006.01)
(52) U.S. Cl. ............... 285/262; 285/146.1; 285/264
(58) Field of Classification Search .......... 285/51, 285/118, 121.7, 138.1, 145.3, 146.1, 146.2, 285/191, 261, 262, 264, 265
See application file for complete search history.

(56) References Cited

U.S. PATENT DOCUMENTS

| | | | |
|---|---|---|---|
| 386,547 A | 7/1888 | Martin | |
| 866,061 A | 9/1907 | Phillips, Jr. | |
| 882,836 A | 3/1908 | McLaughlin | |
| 979,513 A | 12/1910 | Koenig | |
| 1,009,377 A * | 11/1911 | Berry | 285/264 |
| 1,053,648 A * | 2/1913 | Robinson | 285/264 |
| 2,465,373 A | 3/1949 | Hall | |
| 2,813,731 A | 11/1957 | Tracy et al. | |
| 2,824,758 A | 2/1958 | Cattrell | |
| 2,921,803 A | 1/1960 | Tracy et al. | |
| 6,871,882 B2 * | 3/2005 | Challender et al. | 285/261 |

FOREIGN PATENT DOCUMENTS

FR    2900348 A1 * 11/2007

OTHER PUBLICATIONS

International Search Report dated Apr. 1, 2010 for PCT Application No. PCT/IB2009/007806.

* cited by examiner

*Primary Examiner* — Michael P Ferguson
*Assistant Examiner* — Gwendolyn Driggers
(74) *Attorney, Agent, or Firm* — Bradley J. Diedrich

(57) ABSTRACT

A ball and socket coupling is provided. The ball and socket coupling includes a ball body having a passage extending therethrough and a ball portion, and a socket body having a conduit extending therethrough and a ball receiving portion configured to receive the ball portion of the ball body. The ball and socket coupling also includes retaining structure disposed in the passage of the ball body and the conduit of the socket body, where the retaining structure is configured to operatively couple the ball body and the socket body together for permitting relative motion therebetween. The ball and socket coupling further includes motion limiting structure associated with the retaining structure and configured to limit relative motion between the ball body and the socket body to rotation about a single axis that is perpendicular to the direction of fluid flow through the ball and socket coupling.

13 Claims, 12 Drawing Sheets

BALL AND SOCKET COUPLING

BACKGROUND

1. Field of the Invention

The present application relates to ball and socket couplings and, more particularly, to ball and socket fluid couplings having a single axis pivot joint.

2. Description of the Related Art

Articulating ball and socket fluid conveyance couplings are known in the art. These fluid couplings typically include a ball housing received in a socket housing, such that relative rotation between the ball housing and the socket housing is permitted about an infinite number of axes. The use of articulating ball and socket couplings, however, is not optimum for certain applications that require limited or no relative axial rotation parallel to fluid flow between the ball housing and the socket housing. One such application involves couplings used in aircraft. For example, in aircraft fuel delivery systems, it is often desirable to employ a fluid coupling, such as a ball and socket coupling, that eliminates or substantially reduces the amount of relative axial rotation parallel to fluid flow between the ball housing and the socket housing, but does permit some rotation motion about an axis perpendicular to the direction of fluid flow.

Attempts to eliminate or substantially reduce the amount of relative axial rotation parallel to fluid flow between the ball housing and the socket housing have been made in the prior art. For example, U.S. Pat. No. 6,871,882 discloses a ball and socket coupling having external dual tabs on the ball housing positioned inside of dual external slots on the socket housing, the relationship of which permits some axial rotation parallel to fluid flow between the ball housing and the socket housing. There are continual efforts to improve upon the current designs of ball and socket coupling assemblies, particularly to reduce the complexity, cost, and size of the coupling as well as improve overall performance

SUMMARY

In one embodiment, a ball and socket coupling is provided. The ball and socket coupling includes a ball body having a passage extending therethrough and a ball portion, and a socket body having a conduit extending therethrough and a hall receiving portion configured to receive the ball portion of the ball body. The ball and socket coupling also includes retaining structure disposed in the passage of the ball body and the conduit of the socket body, where the retaining structure is configured to operatively couple the ball body and the socket body together for permitting relative motion therebetween. The ball and socket coupling further includes motion limiting structure associated with the retaining structure and configured to limit relative motion between the ball body and the socket body to rotation about a single axis that is perpendicular to the direction of fluid flow through the ball and socket coupling.

In another embodiment, a ball and socket coupling is provided. The ball and socket coupling includes a ball body, a socket body, retaining structure, motion limiting structure associated with the retaining structure, and anti-rotation structure associated with the retaining structure. The ball body extends along and about a central longitudinal ball body axis, and includes a passage extending therethrough and a ball portion that includes a support member disposed in the passage and a partially spherical exterior surface. The support member of the ball portion includes a centrally disposed tube defining a bore extending longitudinally therethrough and a plurality of web elements connecting the tube to the ball body. The socket body extends along and about a central longitudinal socket body axis, and includes a conduit extending therethrough, a ball receiving portion configured to receive the ball portion of the ball body, and a pipe portion that includes a support member disposed in the passage. The support member of the pipe portion includes a centrally disposed tube defining a bore extending longitudinally therethrough and a plurality of web elements connecting the tube to the socket body. The retaining structure is configured to operatively couple the ball body tube and the socket body tube together for permitting relative motion between the ball body and the socket body, while the motion limiting structure is configured to limit relative motion between the ball body and the socket body to rotation about a single axis that is perpendicular to the direction of fluid flow through the ball and socket coupling. The anti-rotation structure is configured to prevent relative rotation between the ball body and the socket body about the respective central longitudinal ball body and socket body axes.

In another embodiment, a ball and socket coupling is provided. The ball and socket coupling includes a ball body, a socket body, retaining structure, and motion limiting structure associated with the retaining structure. The ball body has a passage extending therethrough and a ball portion that includes an inner surface having a pair of opposing ears extending radially inward therefrom. Each of the ears has a bore extending longitudinally therethrough. The socket body has a conduit extending therethrough, a ball receiving portion configured to receive the ball portion of the ball body, and a pipe portion that includes an inner surface having a pair of opposing ears extending radially inward therefrom. Each of the ears has a bore extending longitudinally therethrough. The retaining structure is configured to operatively couple the ball body ears and the socket body ears together for permitting relative motion between the ball body and the socket body, while the motion limiting structure is configured to limit relative motion between the ball body and the socket body to rotation about a single axis that is perpendicular to the direction of fluid flow through the ball and socket coupling.

In another embodiment, a ball and socket coupling is provided. The ball and socket coupling includes a ball body having a passage extending therethrough and a ball portion, and a socket body having a conduit extending therethrough and a ball receiving portion configured to receive the ball portion of the ball body. The ball and socket coupling further includes means for limiting relative motion between the ball body and the socket body to rotation about a single axis that is perpendicular to the direction of fluid flow through the hall and socket coupling, wherein the motion limiting means is disposed in the passage of the ball body and the conduit of the socket body.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as one component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
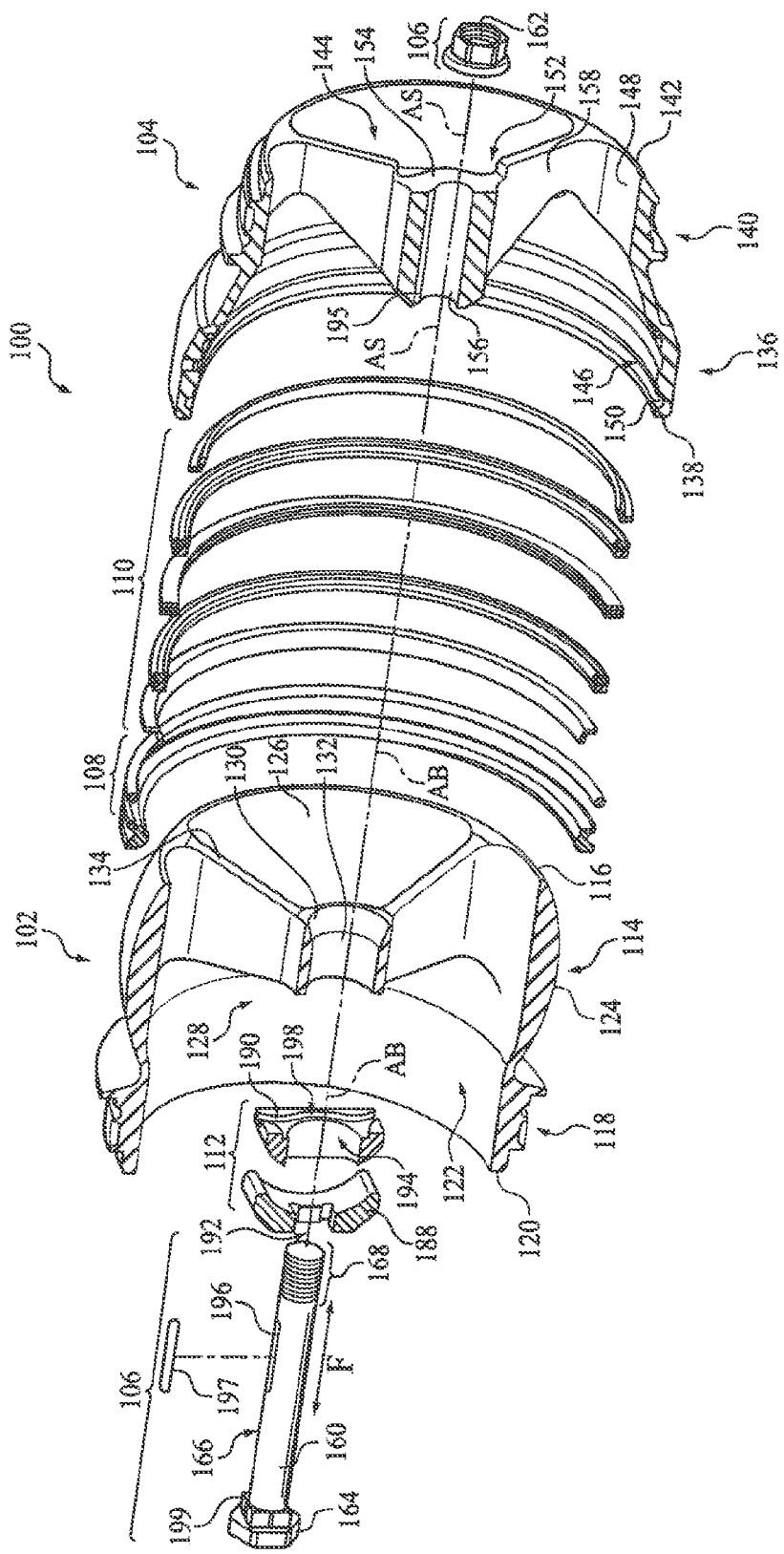
FIG. 1 illustrates an exploded, partially cut-away perspective view of one embodiment of a ball and socket coupling 100.

Certain terminology will be used in the foregoing description for convenience in reference only and will not be limiting. The terms "forward" and "rearward" with respect to each component of the coupling will refer to direction towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline of the coupling. The terms "upward" and "downward" will refer to directions as taken in the drawings in connection with which the terminology is used. All foregoing terms mentioned above include the normal derivative and equivalents thereof.

Figure 2A:
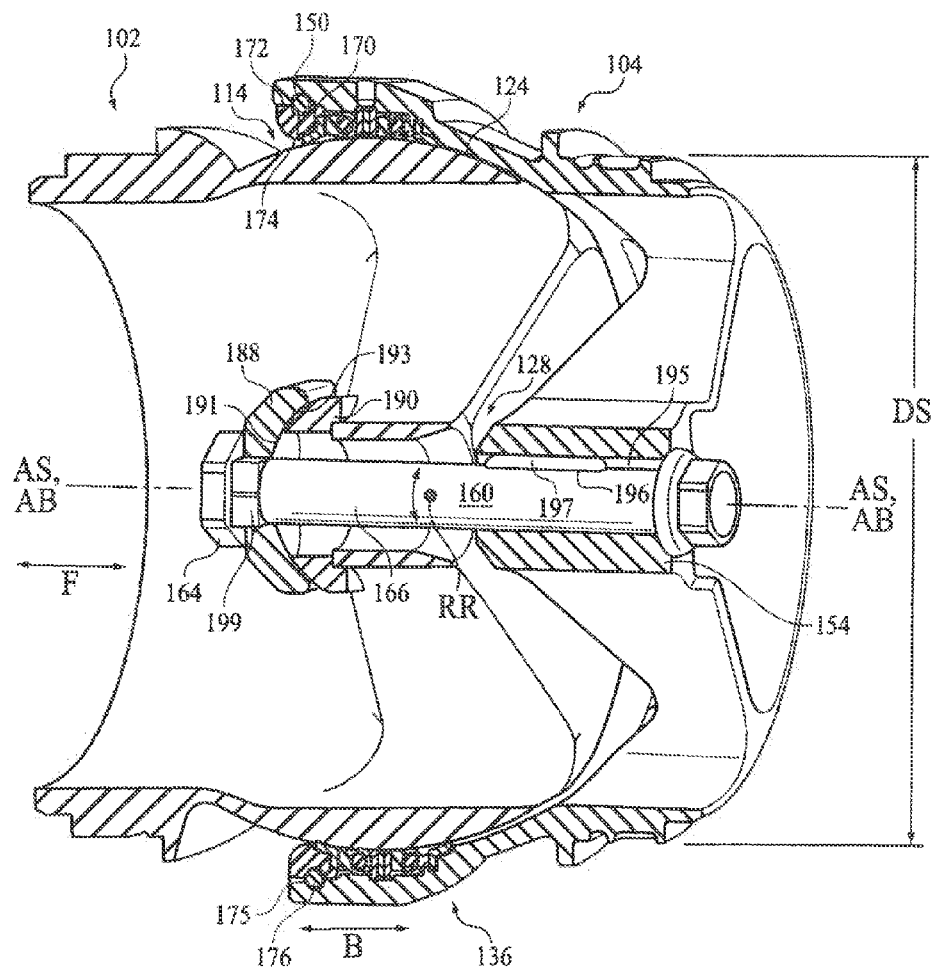
FIG. 2A illustrates a partially cut-away, perspective view of the ball and socket coupling 100 in its assembled state and in its straight position, where the central longitudinal axis AB of the ball body 102 is coaxial with the central longitudinal axis AS of the socket body 104.
Figure 2B:
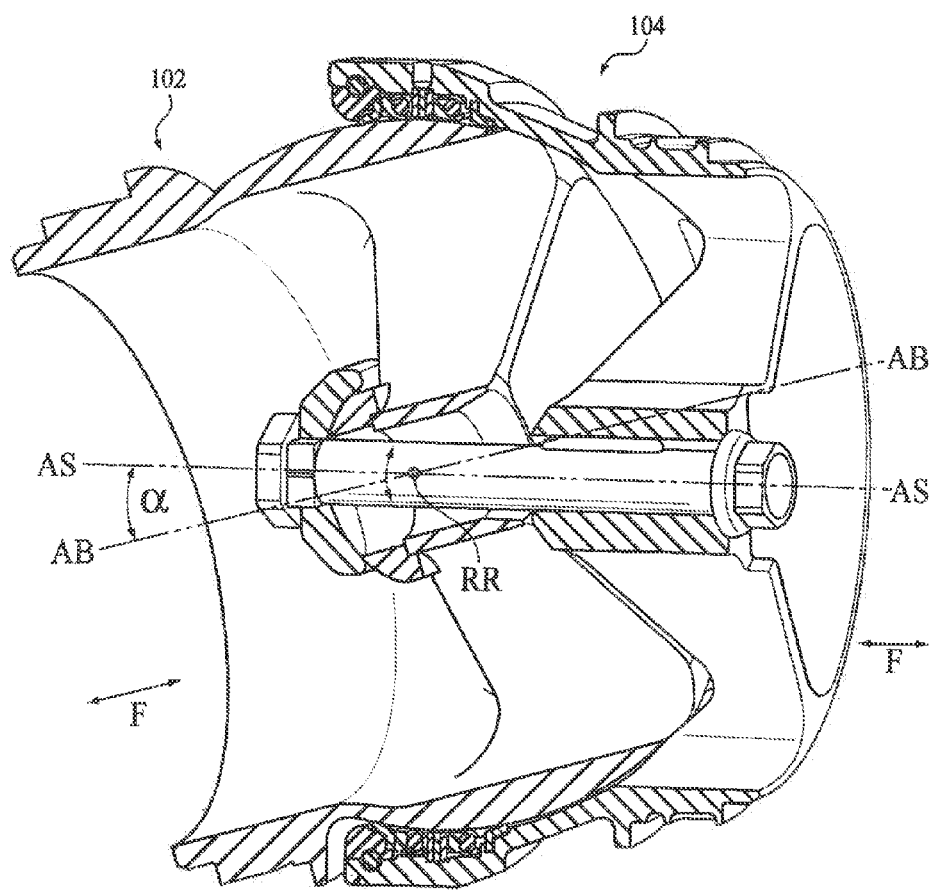
FIG. 2B illustrates a partially cut-away, perspective view of the ball and socket coupling 100 in its assembled state and in a deflected position, where the central longitudinal axis AB of the ball body 102 is oriented at an angle with respect to the central longitudinal axis AS of the socket body 104.

Illustrated in FIG. 1 is an exploded perspective view of one embodiment of a ball and socket coupling 100 that is configured to convey a fluid, such as jet fuel, therethough in the direction represented by arrow F. Generally, the ball and socket coupling 100 in the illustrated embodiment includes a ball body 102, a socket body 104, primary retaining structure 106, a secondary retaining structure 108, an annular seal assembly 110, and motion limiting structure 112. The motion limiting structure 112, which will be described in further detail below, is configured to limit relative motion between the ball body 102 and the socket body 104 to rotation about a single axis that is perpendicular to the direction of fluid flow F. Due to the presence of the motion limiting structure 112, the ball and socket coupling 100 essentially functions as a hinge joint permitting rotational motion about the single axis between a straight position (FIG. 2A) and a deflected position (FIG. 2B).

In the illustrated embodiment, the ball body 102 extends along and about a central longitudinal axis AB. The ball body 102 includes a ball portion 114 having a leading end 116 and a pipe portion 118 having a trailing end 120. The pipe portion 118 of the socket body 104 can include suitable means for attachment to a pipe or conduit (not shown). Extending longitudinally through the ball body 102 between its leading end 116 and its trailing end 120 is a passageway 122 for conveying fluid therethrough. As shown in FIG. 1, the ball portion 114 of the ball body 102 includes a partially spherical exterior surface 124 having a spherical diameter DS and an interior surface 126.

The ball body 102 further includes a support member 128 disposed within the passage 122. The support member 128 includes a centrally disposed tube 130 defining a bore 132 extending longitudinally therethrough and a plurality of web elements 134 connecting the tube 130 to the interior surface 126 of the ball portion 114 of the ball body 102. In alternative embodiments (not shown), the plurality of web elements 134 may connect the tube 130 to an interior surface of the pipe portion 118 of the ball body 102 or may connect the tube 130 to interior surfaces of both the pipe portion 118 and the ball portion 114 of the ball body 102.

In the illustrated embodiment, the socket body 104 extends along and about a central longitudinal axis AS. When the ball and socket coupling 100 is in its straight position as shown in FIG. 2A, the longitudinal axis AS of the socket body 104 is coaxial with the central longitudinal axis AB of the ball body 102. However, when the ball and socket coupling 100 is in a deflected position (i.e., when the ball body 102 is rotated relative to the socket body 104 about an axis that is perpendicular to the direction of fluid flow F) as shown in FIG. 2B, the longitudinal axis AB of the ball body 102 is oriented at an angle α with respect to the central longitudinal axis AS of the socket body 104. In other words, the longitudinal axis AB of the ball body 102 is not coaxial with the central longitudinal axis AS of the socket body 104, when the ball and socket coupling 100 is in a deflected position.

The socket body 104 includes a ball receiving portion 136 having a receiving end 138 and a pipe portion 140 having a remote end 142. The pipe portion 140 of the socket body 104 can include suitable means for attachment to a pipe or conduit (not shown). Extending longitudinally through the socket body 104 between its receiving end 138 and its remote end 142 is a conduit 144 or channel 144 for conveying fluid therethrough. As shown in FIG. 1A, the ball receiving portion 136 of the socket body 104 includes a first interior surface 146 sized and adapted to receive the ball portion 114 of the ball body 102, while the pipe portion 140 of the socket body 104 includes a second interior surface 148. The first interior surface 146 includes an inwardly facing annular groove 150 positioned adjacent to the receiving end 138 of the ball receiving portion 136.

The socket body 104 further includes a support member 152 disposed within the conduit 144. The support member 152 includes a centrally disposed tube 154 defining a bore 156 extending longitudinally therethrough and a plurality of web elements 158 connecting the tube 154 to the second interior surface 148 of the pipe portion 140 of the socket body 104. In alternative embodiments (not shown), the plurality of web elements 158 may connect the tube 154 to at least a portion of the first interior surface 146 of the receiving portion 136 of the socket body 104 or may connect the tube 154 to at least portions of both the first and second interior surfaces 146, 148 of the receiving portion 136 and the pipe portion 140, respectively, of the socket body 104.

As discussed above, the ball and socket coupling 100 includes a primary retaining structure 106 (may also be sometimes referred to herein as "retaining structure 106"). The primary retaining structure 106 is configured to couple the ball body 102 to the socket body 104 and to restrain relative axial movement between the ball body 102 and the socket body 104 along their respective longitudinal axes AB, AS. In the illustrated embodiment, the primary retaining structure 106 includes a bolt 160 and a threaded nut 162 (may also be referred to herein as a bolt and nut assembly). The bolt 160 has a head 164, a main shaft portion 166 that extends longitudinally through both the bore 132 in the ball body 102 and the bore 156 in the socket body 104, and a threaded shaft portion 168 adapted and sized for threading engagement with the nut 162, which is seated against the tube 152 of the socket body 404. When the ball and socket coupling 100 is pressurized generating axial tensile loads, which causes the ball body 102 and the socket body 104 to move in opposite axial directions (arrow B), the head 164 of the bolt 160 and the threaded nut 162 serve to constrain axial movement of the ball body 102 and the socket body 104, respectively. It will be appreciated that the bore 132 in the tube 130 is sufficiently sized to provide enough clearance for the main shaft portion 166 of the bolt 160 to articulate therein during relative rotation of the ball body 102 and the socket body 104. Further, it will be appreciated that other retaining structures are commonly known for coupling the ball body 102 to the socket body 104 to restrain relative axial movement between the ball body 102 and the socket body 104 along their respective longitudinal axes AB, AS.

Optionally, the threaded shaft portion 168 of the bolt 160 may include a flange (not shown) at its end for preventing disengagement of the nut 160. In one embodiment, the flange can be a deformed end portion of the threaded shaft portion 168 of the bolt 160 (eg., through swaging). However, it will be appreciated that the flange can also be, for example, a flat metal disk fastened to the end of the threaded shaft portion 168 of the bolt 160 by a weldment.

As discussed above, the ball and socket coupling 100 also includes a secondary retaining structure 108. The secondary retaining structure 108 is disposed on the "back" of the partially spherical exterior surface 124 of the ball body 104, so that in the event of a sufficient failure of the primary retaining structure 106, the secondary retaining structure 108 will independently secure the ball body 102 and the socket body 104 together, so that the ball and socket coupling 100 will continue operation. Although it is preferable that the ball and socket coupling 100 includes the secondary retaining structure 108, it is optional and may not be included.

The secondary retaining structure 108 includes an annular member 170 disposed in and connected to the ball receiving portion 136 of the socket body 104. The annular member 170 has an outer circumferential surface 172 formed with an outwardly facing annular groove 174 therein that, when in facial registration with the groove 150 in the socket body 104, forms an annular channel 175. The annular member 170 also has an inner secondary retaining diameter DR that is less than the spherical diameter DS of the partially spherical exterior surface 124 when connected to the socket body 104 as the shown in FIG. 1. In the illustrated embodiment, the annular member 170 is embodied as a split ring. However, in alternative embodiments (not shown), the annular member 170 can include threads on its outer circumferential surface while the socket body 104 includes mating threads in its groove 150.

The secondary retaining structure 108 further includes a wire 176 sized for insertion within the annular channel 175 to fixedly connect the annular member 170 to the ball receiving portion 136 of the socket body 104 when inserted therein. In the illustrated embodiment, the annular wire 170 is embodied as a split, annular wire. However, it will be appreciated that other means are available to connect the annular member 170 to the ball receiving portion 136 of the socket body 104, such as by conventional fasteners.

As best illustrated in FIG. 2A, when the ball body 102 and the socket body 104 are connected together resulting in an assembled ball and socket coupling 100, the annular member 170 is disposed apart from and adjacent to the partially spherical exterior surface 124 of the ball portion 114 of the ball body 102. The annular member 170, however, is engagable with the partially spherical exterior surface 124 of the ball portion 114 to permit the ball body 102 and the socket body 104 to articulate relative to each other.

Figure 3:
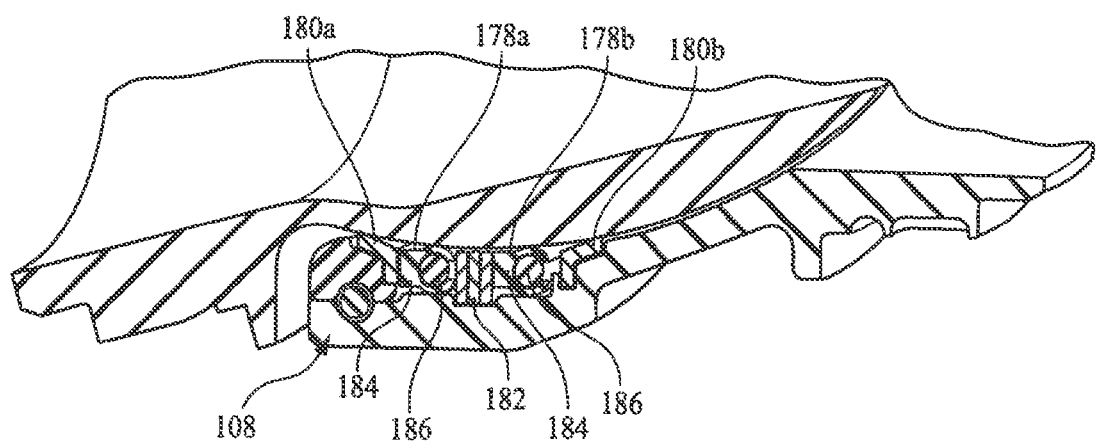
FIG. 3 illustrates a detailed cross-sectional view of the secondary retaining structure 108 and the annular seal assembly 110 employed in the ball and socket coupling 100.

As discussed above, the ball and socket coupling 100 further includes an annular seal assembly 110. The annular seal assembly 110 is configured to provide a fluid-tight seal between the ball body 102 and the socket body 104, even when the ball body 102 is rotated relative to the socket body 104 (or vice versa). In the illustrated embodiment, the annular seal assembly 110 is disposed between and in contact with the partially spherical exterior surface 124 of the ball portion 114 of the ball body 102 and the first interior surface 146 of the socket body 104. As best shown in FIG. 3, the annular seal assembly 110 includes a pair of annular seal elements 178a, 178b, a pair of annular scrapers 180a, 180b, and a split ring divider 182. The split ring divider 182 is disposed between and in contact with the pair of annular seal elements 178a, 178b. One of the annular scrapers 180a is disposed between and in contact with the secondary retaining structure 108 and one of the annular seal elements 178a. The other annular scraper 180b is disposed between and in contact with the other annular seal element 178b, such that the other annular seal element 178b is disposed between and in contact with the split ring divider 182 and the other annular scraper 180b.

While not required, the annular seal element 178a, 178b is typically a conventional spring seal having an elastomeric U-shaped member 184 forming a U-shaped channel with a metallic, toroidal spring 186 contained therein as best shown in FIG. 3. One of ordinary skill in the art would appreciate that other types of conventional seals may be used as the annular seal element, such as those seals filled with various types of springs or other components made from elastic materials (e.g., o-rings, quad seals, and tee seals).

However, it will be appreciated that other arrangements of an annular seal assembly can be used. For instance, it is preferable that the annular seal assembly includes at least one annular seal element. Further, it is also preferable that the annular seal assembly includes at least one annular scraper such that the at least one annular scraper is disposed between and in contact with the secondary retaining structure and the at least one annular seal element.

As discussed above, the ball and socket coupling 100 also includes motion limiting structure 112 configured to limit relative motion between the ball body 102 and the socket body 104 to rotation about a single axis that is perpendicular to the direction of fluid flow F. In the illustrated embodiment, the motion limiting structure 112 includes a first bearing element 188 and a second bearing element 190 that are disposed between the head 164 of the bolt 160 and the support member 128 of the ball body 102.

The first bearing element 188 is formed with a convex, partial cylindrical bearing surface 191 and a bore 192 extending longitudinally therethrough and configured to receive the main shaft portion 166 of the bolt 160. The second bearing element 190 is formed with a concave, partial cylindrical bearing surface 193 and a bore 194 extending longitudinally therethrough and configured to receive the main shaft portion 166 of the bolt 160. The concave, partial cylindrical bearing surface 193 is sized and adapted to receive and engage the convex, partial cylindrical bearing surface 191 of the first bearing element 188. It will be appreciated that the bore 192 in the first bearing element 188 is sufficiently sized to provide enough clearance for the main shaft portion 166 of the bolt 160 to articulate therein during relative rotation of the ball body 102 and the socket body 104.

As shown in FIG. 2A, the mating convex and concave bearing surfaces 191, 193 are defined by a radius, the center point of which defines an axis of rotation RR of the ball body 102 relative to the socket body 104. The axis of rotation RR which is illustrated in FIG. 2B as going into the page is perpendicular to the direction of fluid flow F within the ball and socket coupling 100. Due to the mating relationship of the convex and concave bearing surfaces 191, 193, the convex, partial cylindrical bearing surface 191 of the first bearing element 188 is permitted to rotate relative to the concave, partial cylindrical bearing surface 193 of the second bearing element 190, thereby permitting the ball body 102 to rotate relative to the socket body 104 about the axis of rotation RR. Moreover, due to the fact that the convex and concave bearing surfaces 191, 193 are partially cylindrical in shape, movement of the ball body 102 relative to the socket body 104 is constrained in directions other than the axis of rotation RR. Hence, the motion limiting structure 112 effectively forms a hinge joint between the ball body 102 and the socket body 104.

In an alternative embodiment (not shown), the motion limiting structure 112 may include a single bearing element having a convex, partial cylindrical bearing surface (e.g., similar to the first bearing element 188) that is configured to mate with a concave, partial cylindrical bearing surface formed in the head of the bolt 160. This alternative embodiment will effectively eliminate a component, namely the second bearing element 190. In another alternative embodiment (not shown), the motion limiting structure 112 may include a single bearing element having a concave, partial cylindrical bearing surface (e.g., similar to the first bearing element 188) that is configured to mate with a convex, partial cylindrical bearing surface formed in the tube 130 of the ball body 102. This alternative embodiment will also effectively eliminate a component, namely the first bearing element 188.

In another alternative embodiment (not shown), a concave, partial cylindrical bearing surface may be formed in the head of the bolt 160 and configured to mate with a convex, partial cylindrical bearing surface formed in the tube 130 of the ball body 102. In this alternative embodiment, both the first and second bearing elements may be eliminated and the primary retaining structure 106, in cooperation with the tube 130 of the ball body 102, serves to: i) couple the ball body 102 to the socket body 104, ii) restrain relative axial movement between the ball body 102 and the socket body 104 along their respective longitudinal axes AB, AS and iii) limit relative motion between the ball body 102 and the socket body 104 to rotation about a single axis that is perpendicular to the direction of fluid flow F.

In the illustrated embodiment, the ball and socket coupling 100 further includes anti-rotation structure that is configured to prevent relative rotation between the ball body 102 and the socket body 104 about their respective central longitudinal axes AB, AS. In the illustrated embodiment, the anti-rotation structure includes structural features present on the bolt 160 and the socket body 104 that cooperate with each other to prevent the primary retaining structure 106 (i.e., the bolt 160 and the nut 162) from rotating about the central longitudinal axis AS of the socket body 104. More specifically, the anti-rotation structure includes an inwardly facing, longitudinally extending groove 195 formed in an inner surface of the tube 154, an outwardly facing, longitudinally extending keyway 196 formed in the outer surface of the main shaft portion 166 of the bolt 160, and a key 197 adapted and sized for insertion within the groove 195 in the tube 154 and the keyway 196 in the bolt 160, when the groove 195 and the keyway 196 are in facial registration with one another. When the key 197 is inserted within both the groove 195 and the keyway 196, the bolt 160 is locked to the support member 152 of the socket body 104, thereby preventing rotation of the primary retaining structure 106 relative to the socket body 104.

Figure 2C:
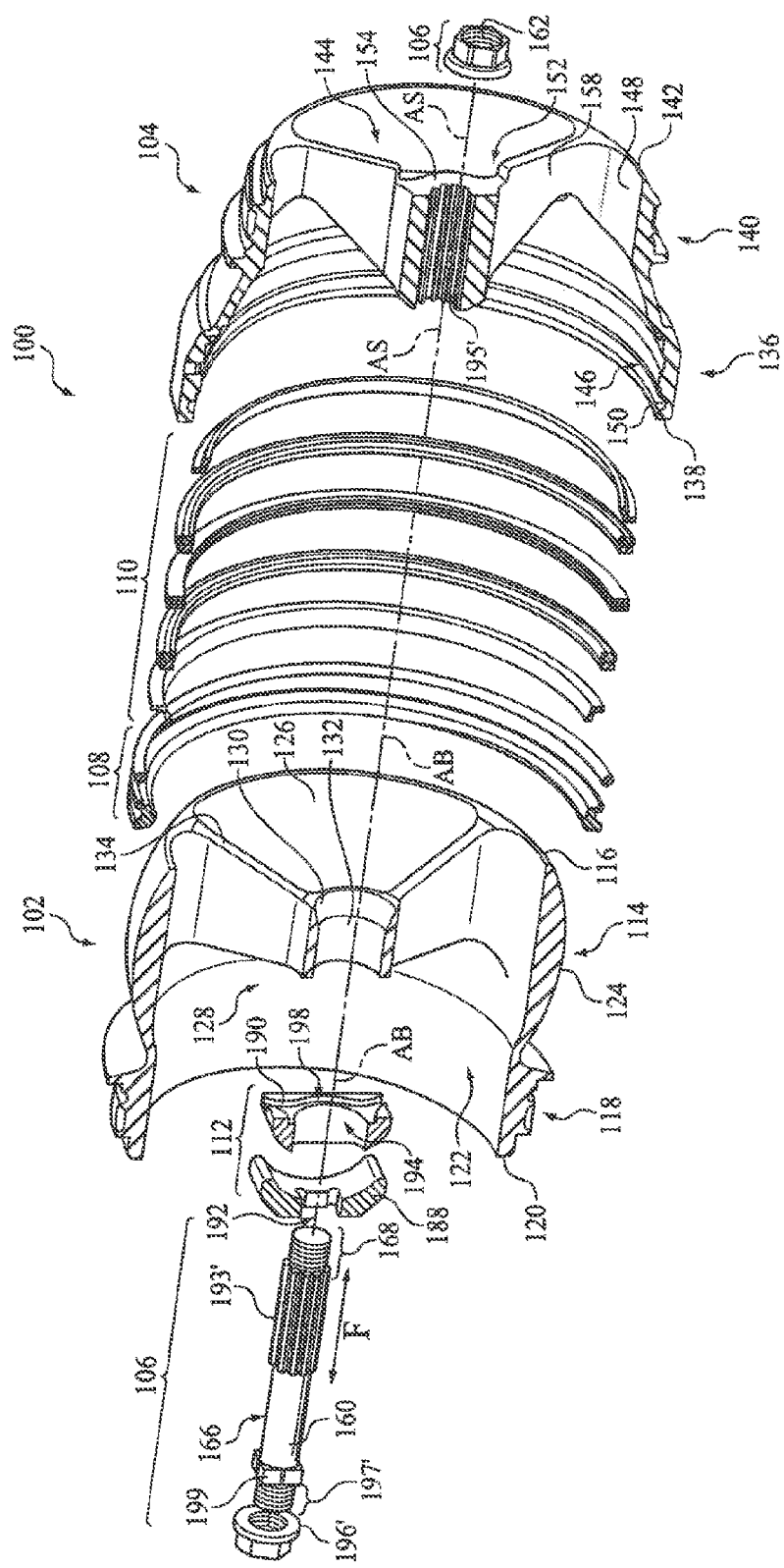
FIG. 2C illustrates an exploded, partially cut-away perspective view of another embodiment of a ball and socket coupling 100'.

It will be appreciated that other structural means are available to prevent rotation of the primary retaining structure 106 relative to the socket body 104. For example, FIG. 2C illustrates an alternative anti-rotation structure to prevent relative rotation between the ball body 102 and the socket body 104 about their respective central longitudinal axes AB, AS. As shown in FIG. 2C, the anti-rotation structure includes an external splined portion 193' formed in the bolt 160 and configured for insertion into a mating groove arrangement 195' formed in the tube 154 of the socket body 104. When the external splined portion 193' of the bolt 160 is inserted within the mating groove arrangement 195' of the tube 154, the bolt 160 is locked to the support member 152 of the socket body 104, thereby preventing rotation of the primary retaining structure 106 relative to the socket body 104. In this embodiment, instead of employing a head on the bolt 160, the bolt 160 includes a second threaded portion 196' for mating with a second nut 197'.

In the illustrated embodiment, the anti-rotation structure further includes features present on the bolt 160 and the first and second bearing elements 188, 190 that cooperate with each other to prevent the primary retaining structure 106 (i.e., the bolt 160 and the nut 162) from rotating about the central longitudinal axis AS of the socket body 104. More specifically, the anti-rotation structure includes: i) a grooved surface 198 formed in the first bearing element 188 that interlocks with the web elements 134 of the support member 128 of the ball body 102 to prevent the first bearing element 188 from rotating relative to the ball body 102 and ii) the bore 194 in the second bearing element 190 having a square-shaped cross-section for receiving a square-shaped shaft portion 199 of the bolt 160 to prevent the bolt 160 from rotating relative to the second bearing element 190. In combination, the anti-rotation structure prevents relative rotation between the ball body 102 and the socket body 104 about their respective central longitudinal axes AB, AS.

Unlike prior art ball and socket couplings, the ball and socket coupling 100 described above and illustrated in FIGS. 1, 2A-2B, and 3 is capable of limiting relative rotation between the ball body 102 and the socket body 104 about a single axis that is perpendicular to the direction of fluid flow F, while restraining relative rotation between the ball body 102 and the socket body 104 about their respective central longitudinal axes AB, AS and restraining relative axial movement between the ball body 102 and the socket body 104 along the direction of fluid flow F. Additionally, the ball and socket coupling 100 may also be designed with a smaller envelope size due to the anti-rotation structure being located within the coupling 100.

Figure 4A:
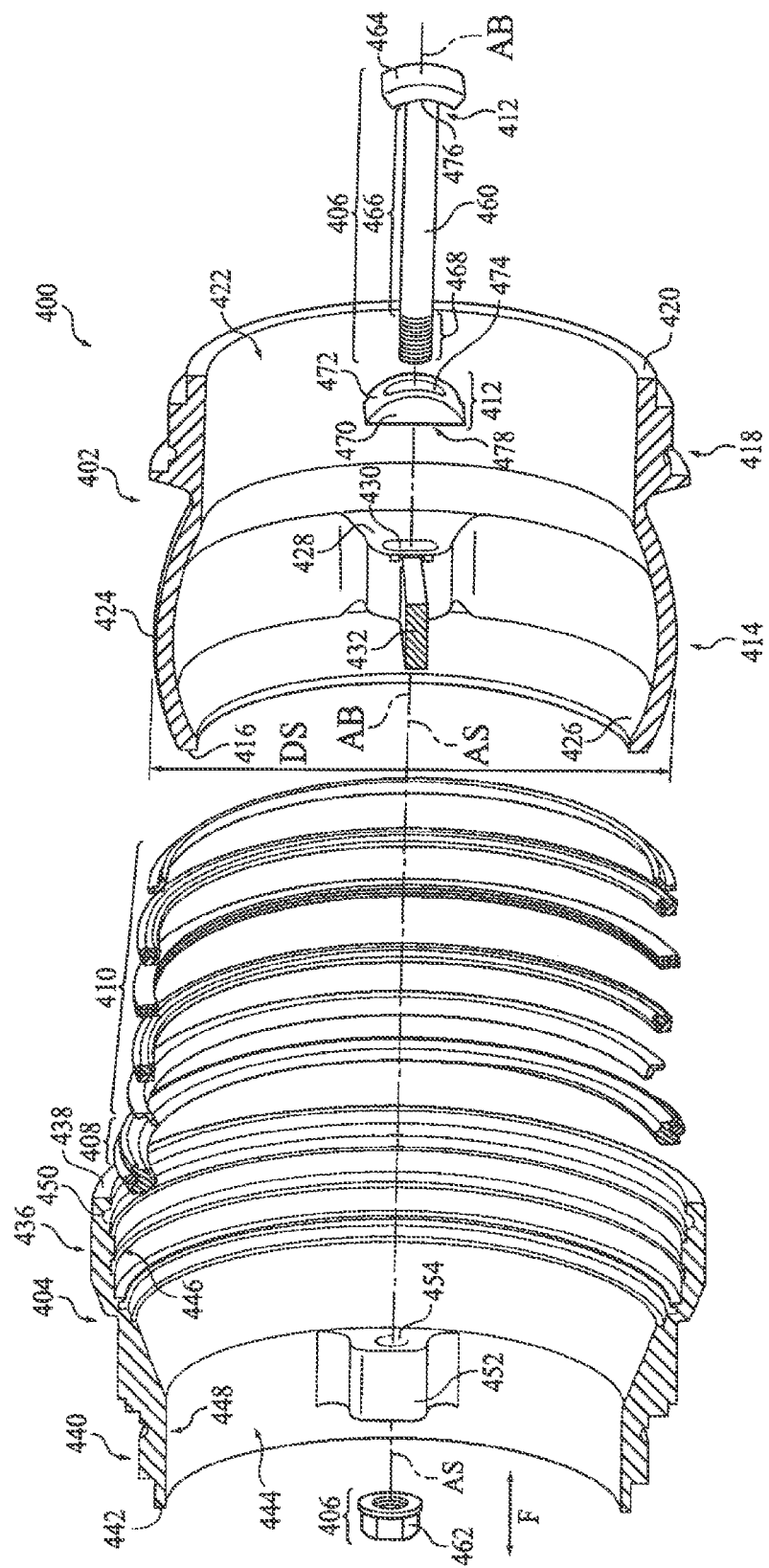
FIG. 4A illustrates an exploded, partially cut-away perspective view of another embodiment of a ball and socket coupling 400.
Figure 4B:
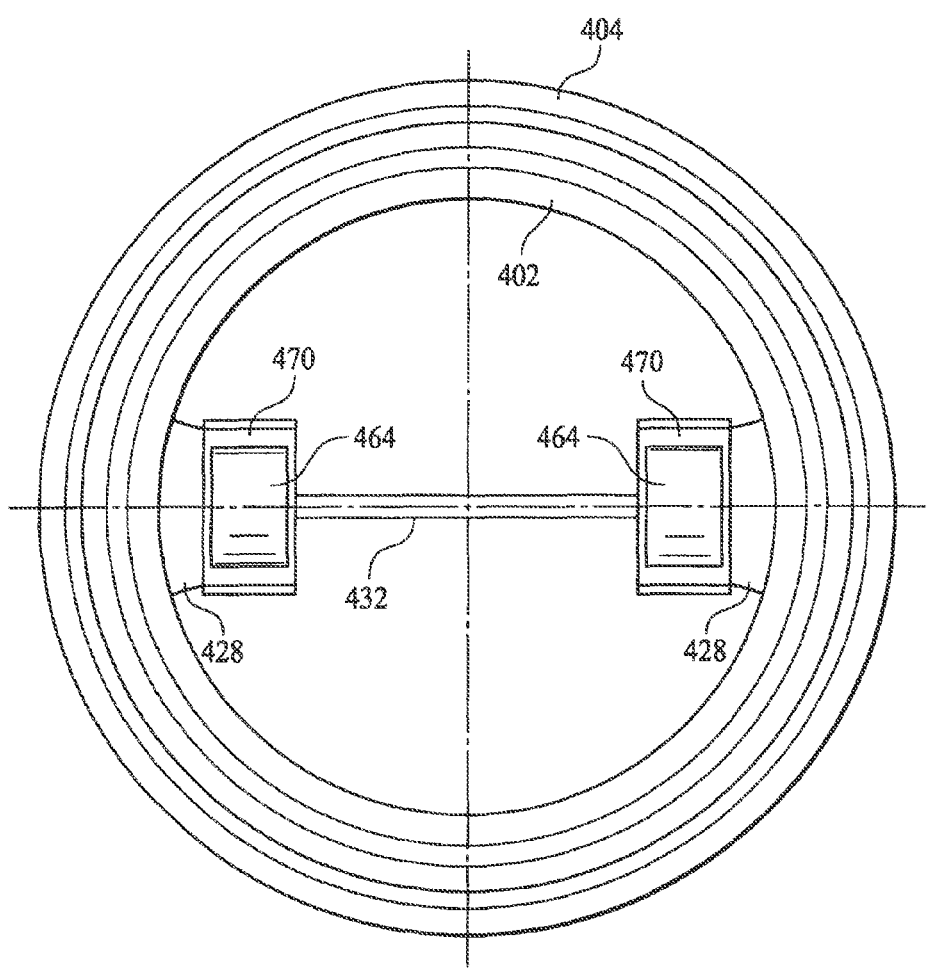
FIG. 4B illustrates an end view of the ball and socket coupling 400.

Illustrated in FIGS. 4A and 4B are exploded, partially cut-away perspective and end views of another embodiment of a ball and socket coupling 400 that is configured to convey a fluid, such as jet fuel, therethough in the direction represented by arrow F. Generally, the ball and socket coupling 400 in the illustrated embodiment includes a ball body 402, a socket body 404, primary retaining structure 406, secondary retaining structure 408, an annular seal assembly 410, and motion limiting structure 412. The motion limiting structure 412, which will be described in further detail below, is configured to limit relative motion between the ball body 402 and the socket body 404 to rotation about a single axis that is perpendicular to the direction of fluid flow F. Due to the presence of the motion limiting structure 412, the ball and socket coupling 400 essentially functions as a hinge Joint permitting rotational motion about the single axis between a straight position (FIG. 5A) and a deflected position (FIG. 5B).

In the illustrated embodiment, the ball body 402 extends along and about a central longitudinal axis AB. The ball body 402 includes a ball portion 414 having a leading end 416 and a pipe portion 418 having a trailing end 420. The pipe portion 418 of the socket body 404 can include suitable means for attachment to a pipe or conduit (not shown). Extending longitudinally through the ball body 402 between its leading end 416 and its trailing end 420 is a passageway 422 for conveying fluid therethrough. As shown in FIG. 4A, the ball portion 414 of the ball body 402 includes a partially spherical exterior surface 424 having a spherical diameter DS and an interior surface 426.

The ball body 402 further includes a pair of opposing ears 428 (only one shown in FIG. 4A) extending radially inward from the interior surface 426 of the ball body 402. Each ear 428 includes a bore 430 extending longitudinally therethrough and configured to receive the primary retaining structure 406. To provide additional stability, the opposing ears 428 are joined together with a cross-member 432. However, in an alternative embodiment (not shown), the cross-member 432 is optional and may not be included.

In the illustrated embodiment, the socket body 404 extends along and about a central longitudinal axis AS. When the ball and socket coupling 400 is in its straight position as shown in FIG. 4A, the longitudinal axis AS of the socket body 404 is coaxial with the central longitudinal axis AB of the ball body 402. However, when the ball and socket coupling 400 is in a deflected position (i.e., when the ball body 402 is rotated relative to the socket body 404 about an axis that is perpendicular to the direction of fluid flow F) as shown in FIG. 5B, the longitudinal axis AB of the ball body 402 is oriented at an angle α with respect to the central longitudinal axis AS of the socket body 404. In other words, the longitudinal axis AB of the ball body 402 is not coaxial with the central longitudinal axis AS of the socket body 404, when the ball and socket coupling 400 is in a deflected position.

The socket body 404 includes a ball receiving portion 436 having a receiving end 438 and a pipe portion 440 having a remote end 442. The pipe portion 440 of the socket body 404 can include suitable means for attachment to a pipe or conduit (not shown). Extending longitudinally through the socket body 404 between its receiving end 438 and its remote end 442 is a conduit 444 for conveying fluid therethrough. As shown in FIG. 4A, the ball receiving portion 436 of the socket body 404 includes a first interior surface 446 sized and adapted to receive the ball portion 414 of the ball body 402, while the pipe portion 440 of the socket body 404 includes a second interior surface 448. The first interior surface 446 includes an inwardly facing annular groove 450 positioned adjacent to the receiving end 438 of the ball receiving portion 436.

The socket body 404 further includes a pair of opposing ears 452 extending radially inward from the second interior surface 448 of the socket body 404. Each ear 452 includes a bore 454 extending longitudinally therethrough and configured to receive the primary retaining structure 406.

As discussed above, the ball and socket coupling 400 includes primary retaining structure 406 (may also be sometimes referred to herein as "retaining structure 406"). The primary retaining structure 406 is configured to couple the ball body 402 to the socket body 404 and to restrain relative axial movement between the ball body 402 and the socket body 404 along their respective longitudinal axes AB, AS. In the illustrated embodiment, the primary retaining structure 406 includes a pair of bolts 460 and a pair of threaded nuts 462 (may also be referred to herein as a pair of bolt and nut assemblies). Each bolt 460 has a head 464, a main shaft portion 466 that extends longitudinally through the bore 430 in a respective ear 428 of the ball body 402 and the bore 452 in a respective ear 450 of the socket body 404, and a threaded shaft portion 468 adapted and sized for threading engagement with a respective nut 462, which is seated against a respective ear 452 of the socket body 404. It will be appreciated that the bore 430 in each ear 428 of the ball body 402 is sufficiently sized to provide enough clearance for the main shaft portion 466 of the bolt 460 to articulate therein during relative rotation of the ball body 402 and the socket body 404.

When the ball and socket coupling 400 is pressurized generating axial tensile loads, which causes the ball body 402 and the socket body 404 to move in opposite axial directions (arrow B), the head 464 of the bolt 460 and the threaded nut 462 serve to constrain axial movement of the ball body 402 and the socket body 404, respectively. Additionally, due to the presence of the opposing bolt and nut assemblies positioned near the inner surfaces of the ball and socket bodies 402, 404, relative rotation between the ball body 402 and the socket body 404 about their respective longitudinal axes AB, AS is prevented.

Optionally, the threaded shaft portion 468 of each bolt 460 may include a flange (not shown) at its end for preventing disengagement of a respective nut 460. In one embodiment, the flange can be a deformed end portion of the threaded shaft portion 468 of the bolt 460 (e.g., through swaging). However, it will be appreciated that the flange can also be, for example, a flat metal disk fastened to the end of the threaded shaft portion 468 of the bolt 460 by a weldment.

As discussed above, the ball and socket coupling 400 includes a secondary retaining structure 408. The secondary retaining structure 408 is disposed on the "back" of the partially spherical exterior surface 424 of the ball body 404, so that in the event of a sufficient failure of the primary retaining structure 406, the secondary retaining structure 408 will independently secure the ball body 402 and the socket body 404 together to permit the ball and socket coupling 400 to continue to operate. In the illustrated embodiment, the secondary retaining structure 408 is substantially similar to the secondary retaining structure 108 discussed above and illustrated in FIGS. 1, 2A-2B, and 3 and will not be repeated to avoid redundancy. Although it is preferable that the ball and socket coupling 400 includes the secondary retaining structure 408, it is optional and may not be included.

Similarly, as discussed above, the ball and socket coupling 400 includes an annular seal assembly 410. The annular seal assembly 410 is configured to provide a fluid-tight seal between the ball body 402 and the socket body 404, even when the ball body 402 is rotated relative to the socket body 404 (or vice versa). In the illustrated embodiment, the annular seal assembly 410 is substantially similar to the annular seal assembly 110 discussed above and illustrated in FIGS. 1, 2A-2B, and 3 and will not be repeated to avoid redundancy.

As discussed above, the ball and socket coupling 400 also includes motion limiting structure 412 configured to limit relative motion between the ball body 402 and the socket body 404 to rotation about a single axis that is perpendicular to the direction of fluid flow F. In the illustrated embodiment, the motion limiting structure 412 includes a bearing element 470 that is disposed between the head 464 of each bolt 460 and a respective ear 428 of the ball body 402.

Each bearing element 470 is formed with a convex, partial cylindrical bearing surface 472 and a 474 extending longitudinally therethrough and configured to receive the main shaft portion 466 of each bolt 460. The motion limiting structure 412 also includes a mating concave, partial cylindrical bearing surface 476 formed in the head 464 of each bolt 460, where mating concave, partial cylindrical bearing surface 476 is sized and adapted to receive the convex, partial cylindrical bearing surface 472 of a respective bearing element 470. To prevent each bearing element 470 from rotating relative to the ball body 402, a grooved surface 478 is formed in the bearing element 470 (opposite the convex, partial cylindrical bearing surface 472) to interlock with a receptive ear 428 of the ball body 402 and the cross-member 432. It will be appreciated that the bore 474 in each bearing element 470 is sufficiently sized and shaped to provide enough clearance for the main shaft portion 466 of a respective bolt 460 to articulate therein during relative rotation of the ball body 402 and the socket body 404.

Figure 5A:
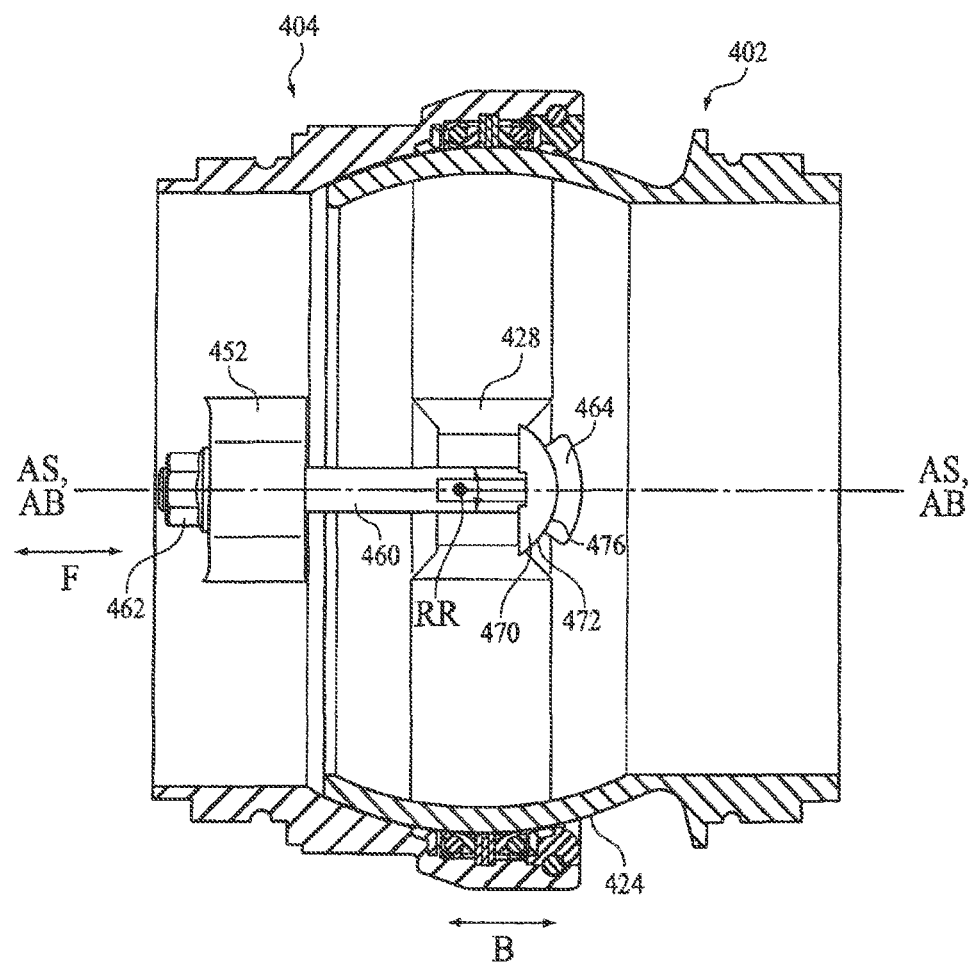
FIG. 5A illustrates a partially cut-away, perspective view of the ball and socket coupling 400 in its assembled state and in its straight position, where the central longitudinal axis AB of the ball body 402 is coaxial with the central longitudinal axis AS of the socket body 404.
Figure 5B:
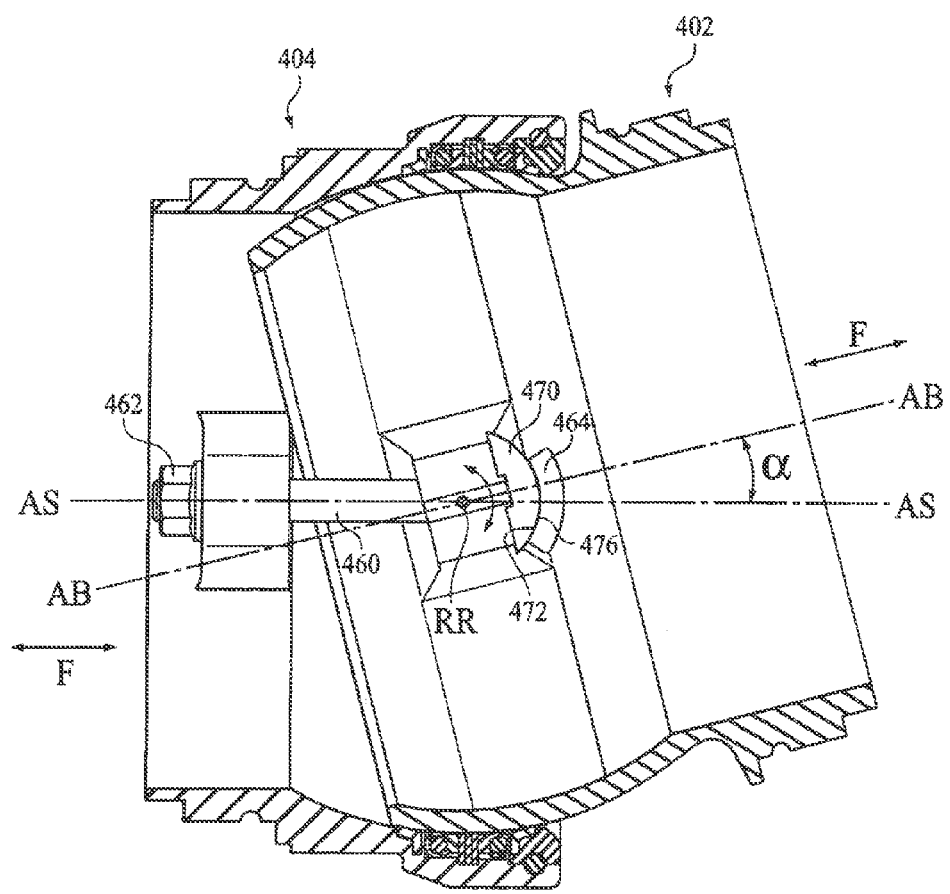
FIG. 5B illustrates a partially cut-away, perspective view of the ball and socket coupling 400 in its assembled state and in a deflected position, where the central longitudinal axis AB of the ball body 402 is oriented at an angle with respect to the central longitudinal axis AS of the socket body 404.

As shown in FIG. 5A, the mating convex and concave hearing surfaces 472, 476 are defined by a radius, the center point of which defines an axis of rotation RR of the ball body 402 relative to the socket body 404. The axis of rotation RR is perpendicular to the direction of fluid flow F within the ball and socket coupling 400. Due to the mating relationship of the convex and concave bearing surfaces 472, 476, the convex, partial cylindrical bearing surface 472 of the bearing element 470 is permitted to rotate relative to the concave, partial cylindrical bearing surface 476 of the head 464 of a respective bolt 460, thereby permitting the ball body 402 to rotate relative to the socket body 404 about the axis of rotation RR. Moreover, due to the fact that the convex and concave bearing surfaces 472, 476 are partially cylindrical in shape, movement of the ball body 402 relative to the socket body 404 is constrained in directions other than about a single axis (i.e., the axis of rotation RR). Hence, the motion limiting structure 412 effectively forms a hinge joint between the ball body 402 relative to the socket body 404.

In an alternative embodiment (not shown), each bearing element 470 of the motion limiting structure 412 may be omitted and replaced with a convex, partial cylindrical bearing surface formed in a respective ear 428 of the ball body 402 and configured to mate with the concave, partial cylindrical bearing surface 476 formed in the head of the bolt 460. In this alternative embodiment, both the first and second bearing elements may be eliminated and the primary retaining structure 406, in cooperation with the ears 428 of the ball body 402, serves to: i) couple the ball body 402 to the socket body 404, ii) restrain relative axial movement between the ball body 402 and the socket body 404 along their respective longitudinal axes AB, AS and iii) limit relative motion between the ball body 402 and the socket body 404 to rotation about a single axis that is perpendicular to the direction of fluid flow F.

In another alternative embodiment (not shown), the motion limiting structure 412 may include a second bearing element having a concave, partial cylindrical bearing surface (e.g., similar to the second bearing element 190 described above and illustrated in FIGS. 1, 2A-2B, and 3) that is configured to mate with the convex, partial cylindrical bearing surface of the bearing element 470. In this case, the head 464 of each bolt 460 would not include the concave, partial cylindrical bearing surface. In another alternative embodiment (not shown), the motion limiting structure 412 may include a single bearing element having a concave, partial cylindrical bearing surface (e.g., similar to the first bearing element 188 described above and illustrated in FIGS. 1, 2A-2B, and 3) that is configured to mate with a convex, partial cylindrical bearing surface formed in a respective ear 428 of the ball body 402. In this case, the head 464 of each bolt 460 would also not include the concave, partial cylindrical bearing surface.

In an alternative embodiment, it will be appreciated that the primary retaining structure 406 and the motion limiting structure 412 may be re-configured to be provided external to the ball and socket coupling 400. In other words, the primary retaining structure 406 and the motion limiting structure 412 would not be in the path of fluid flow F.

Unlike prior art ball and socket couplings, the ball and socket coupling 400 described above and illustrated in FIGS. 4A-4B and 5A-5B is capable of limiting relative rotation between the ball body 402 and the socket body 404 about a single axis that is perpendicular to the direction of fluid flow F, while restraining relative rotation between the ball body 402 and the socket body 404 about their respective central longitudinal axes AB, AS and restraining relative axial movement between the ball body 402 and the socket body 404 along the direction of fluid flow F. Additionally, the ball and socket coupling 400 may also be designed with a smaller envelope size due to the motion limiting structure 412 being located within the coupling 400.

Figure 6:
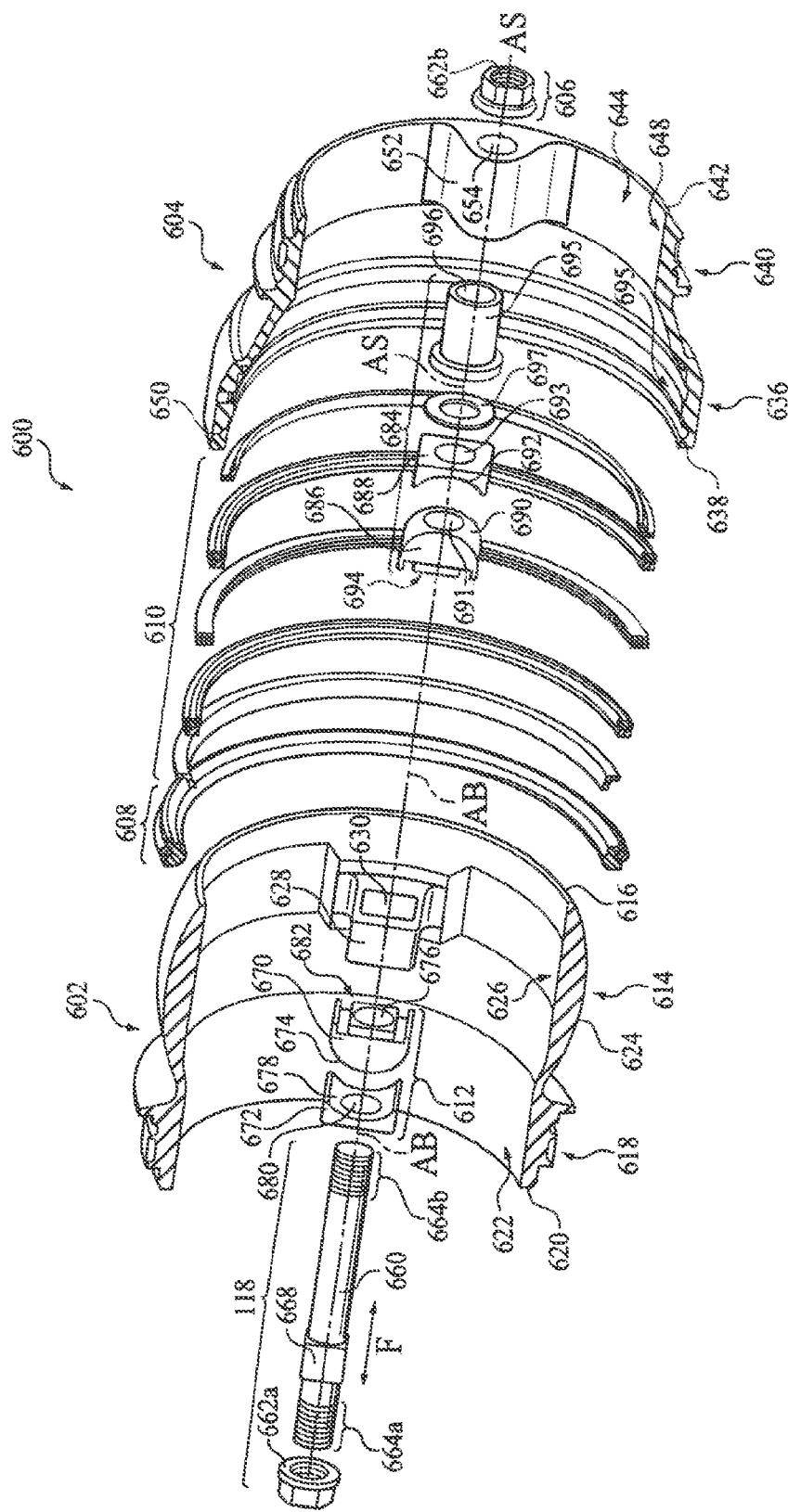
FIG. 6 illustrates an exploded, partially cut-away perspective view of another embodiment of a ball and socket coupling 600.

Illustrated in FIG. 6 is an exploded, partially cut-away perspective view of another embodiment of a ball and socket coupling 600 that is configured to convey a fluid, such as jet fuel, therethough in the direction represented by arrow F. Generally, the ball and socket coupling 600 in the illustrated embodiment includes a ball body 602, a socket body 604, primary retaining structure 606, secondary retaining structure 608, an annular seal assembly 610, and motion limiting structure 612. The rotation permitting structure 612, which will be described in further detail below, is configured to permit relative rotation between the ball body 602 and the socket body 604 about a single axis that is perpendicular to the direction of fluid flow F. Due to the presence of the motion limiting structure 612, the ball and socket coupling 600 essentially functions as a hinge joint permitting rotational motion about the single axis between a straight position (FIG. 7A) and a deflected position (FIG. 7B).

In the illustrated embodiment, the ball body 602 extends along and about a central longitudinal axis AB. The ball body 602 includes a ball portion 614 having a leading end 616 and a pipe portion 618 having a trailing end 620. The pipe portion 618 of the socket body 604 can include suitable means for attachment to a pipe or conduit (not shown). Extending longitudinally through the ball body 602 between its leading end 616 and its trailing end 620 is a passageway 622 for conveying fluid therethrough. As shown in FIG. 6, the ball portion 614 of the ball body 602 includes a partially spherical exterior surface 624 having a spherical diameter DS and an interior surface 626.

The ball body 602 further includes a pair of opposing ears 628 extending radially inward from the interior surface 626 of the ball body 602. Each ear 628 includes a bore 630 extending longitudinally therethrough and configured to receive the primary retaining structure 606. Optionally, the opposing ears 628 may be joined together with a cross-member (not shown) to increase stability.

In the illustrated embodiment, the socket body 604 extends along and about a central longitudinal axis AS. When the ball and socket coupling 600 is in its straight position as shown in FIG. 6, the longitudinal axis AS of the socket body 604 is coaxial with the central longitudinal axis AB of the ball body 602. However, when the ball and socket coupling 600 is in a deflected position (i.e., when the ball body 602 is rotated relative to the socket body 604 about an axis that is perpendicular to the direction of fluid flow F) as shown in FIG. 7B, the longitudinal axis AB of the ball body 602 is oriented at an angle α with respect to the central longitudinal axis AS of the socket body 604. In other words, the longitudinal axis AB of the ball body 602 is not coaxial with the central longitudinal axis AS of the socket body 604, when the ball and socket coupling 600 is in a deflected position.

The socket body 606 includes a ball receiving portion 636 having a receiving end 638 and a pipe portion 640 having a remote end 642. The pipe portion 640 of the socket body 604 can include suitable means for attachment to a pipe or conduit (not shown). Extending longitudinally through the socket body 604 between its receiving end 638 and its remote end 642 is a conduit 644 for conveying fluid therethrough. As shown in FIG. 6, the ball receiving portion 636 of the socket body 604 includes a first interior surface 646 sized and adapted to receive the ball portion 614 of the ball body 602, while the pipe portion 640 of the socket body 604 includes a second interior surface 648. The first interior surface 646 includes an inwardly facing annular groove 650 positioned adjacent to the receiving end 638 of the ball receiving portion 636.

The socket body 604 further includes a pair of opposing ears 652 (only one shown in FIG. 6) extending radially inward from the second interior surface 648 of the socket body 604. Each ear 652 includes a bore 654 extending longitudinally therethrough and configured to receive the primary retaining structure 606.

As discussed above, the ball and socket coupling 600 includes primary retaining structure 606 (may also be sometimes referred to herein as "retaining structure 606"). The primary retaining structure 606 is configured to couple the ball body 602 to the socket body 604 and to restrain relative axial movement between the ball body 602 and the socket body 604 along their respective longitudinal axes AB, AS. In the illustrated embodiment, the primary retaining structure 606 includes two pairs of bolts 660 and two pairs of threaded nuts 662a, 662b (may also be referred to herein two pairs of bolt and nut assemblies). Each bolt 660 has threaded end portions 664a, 664b separated by a main shaft portion 666 that extends longitudinally through the bore 630 in a respective ear 628 of the ball body 602 and the bore 652 in a respective ear 650 of the socket body 604. The threaded shaft portions 664a, 664b are adapted and sized for threading engagement with a respective nut 662a, 662b, one of which (i.e., threaded nut 662b) is seated against a respective ear 652 of the socket body 604. The main shaft portion 666 of each bolt 660 also includes a square-shaped shaft portion 668 that cooperates with the bore 630 in a respective ear 628 of the ball body 602 to prevent each bolt 160 from rotating relative to the ball body 602 and to increase anti-torsion stability. It will be appreciated that the bore 630 in each ear 628 of the ball body 602 is sufficiently sized and shaped to provide enough clearance for the main shaft portion 666 of the bolt 660 to articulate therein during relative rotation of the ball body 602 and the socket body 604.

When the ball and socket coupling 600 is pressurized generating axial tensile loads, which causes the ball body 602 and the socket body 604 to move in opposite axial directions (arrow B), the threaded nut 662a serves to constrain axial movement of the ball body 602, while the threaded nut 662b serves to constrain axial movement of the socket body 604. Additionally, due to the presence of the pair of opposing bolt and nut assemblies positioned near the inner surfaces of the ball and socket bodies 602, 604, relative rotation between the ball body 602 and the socket body 604 about their respective longitudinal axes AB, AS is prevented.

Optionally, the threaded shaft portions 664a, 664b of each bolt 660 may include a flange (not shown) at its end for preventing disengagement of a respective nut 660. In one embodiment, the flange can be a deformed end portion of the threaded shaft portions 664a, 664b of each bolt 660 (e.g., through swaging). However, it will be appreciated that the flange can also be, for example, a flat metal disk fastened to the end of the threaded shaft portions 664a, 664b of each bolt 660 by a weldment.

As discussed above, the ball and socket coupling 600 includes a secondary retaining structure 608. The secondary retaining structure 608 is disposed on the "back" of the partially spherical exterior surface 624 of the ball body 604, so that in the event of a sufficient failure of the primary retaining structure 606, the secondary retaining structure 608 will independently secure the ball body 602 and the socket body 604 together to allow the ball and socket coupling 600 to continue to function. In the illustrated embodiment, the secondary retaining structure 608 is substantially similar to the secondary retaining structure 108 discussed above and illustrated in FIGS. 1, 2A-2B, and 3 and will not be repeated to avoid redundancy. Although it is preferable that the ball and socket coupling 600 includes the secondary retaining structure 608, it is optional and may not be included.

Similarly, as discussed above, the ball and socket coupling 600 includes an annular seal assembly 610. The annular seal assembly 610 is configured to provide a fluid-tight seal between the ball body 602 and the socket body 604, even when the ball body 602 is rotated relative to the socket body 604 (or vice versa). In the illustrated embodiment, the annular seal assembly 610 is substantially similar to the annular seal assembly 110 discussed above and illustrated in FIGS. 1, 2A-2B, and 3 and will not be repeated to avoid redundancy.

As discussed above, the ball and socket coupling 600 also includes motion limiting structure 612 configured to limit relative motion between the ball body 602 and the socket body 604 to rotation about a single axis that is perpendicular to the direction of fluid flow F. In the illustrated embodiment, the motion limiting structure 612 includes a pair of first bearing elements 670 and a pair of second bearing elements 672 that are disposed between the threaded nut 662a of each bolt 660 and the bore 630 in a respective ear 628 of the ball body 602.

Each first bearing element 670 is formed with a convex, partial cylindrical bearing surface 674 and a bore 676 extending longitudinally therethrough and configured to receive the main shaft portion 666 of each bolt 660. The second bearing element 672 is formed with a concave, partial cylindrical bearing surface 678 and a bore 680 extending longitudinally therethrough and configured to receive the main shaft portion 666 of the bolt 660. The concave, partial cylindrical bearing surface 678 is sized and adapted to receive and engage the convex, partial cylindrical bearing surface 674 of each first bearing element 670. To prevent each first bearing element 670 from rotating relative to the ball body 602, each first bearing element 670 includes a male-featured surface 682 (opposite the convex, partial cylindrical bearing surface 674) that interlocks with female features in a respective ear 628 of the ball body 602. It will be appreciated that the bore 676 in each first bearing element 670 is sufficiently sized and shaped to provide enough clearance for the main shaft portion 666 of each bolt 660 to articulate therein during relative rotation of the ball body 602 and the socket body 604.

Figure 7A:
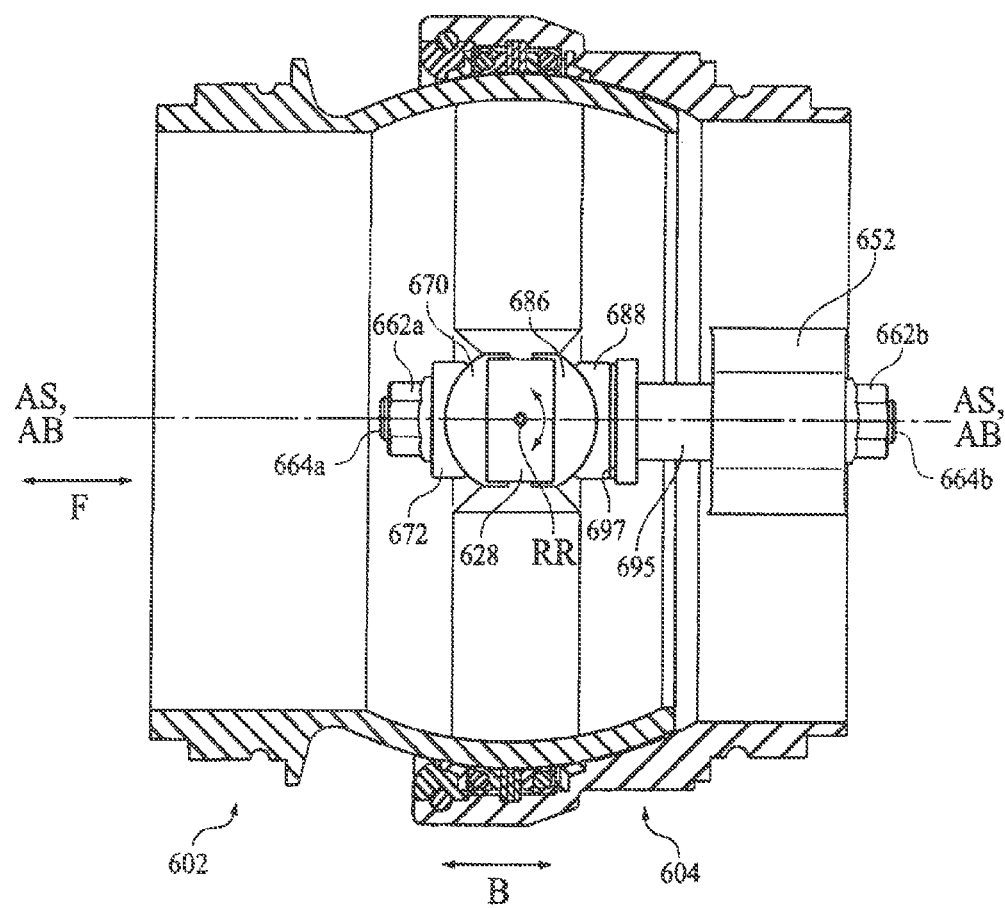
FIG. 7A illustrates a partially cut-away, perspective view of the ball and socket coupling 600 in its assembled state and in its straight position, where the central longitudinal axis AB of the ball body 602 is coaxial with the central longitudinal axis AS of the socket body 604.
Figure 7B:
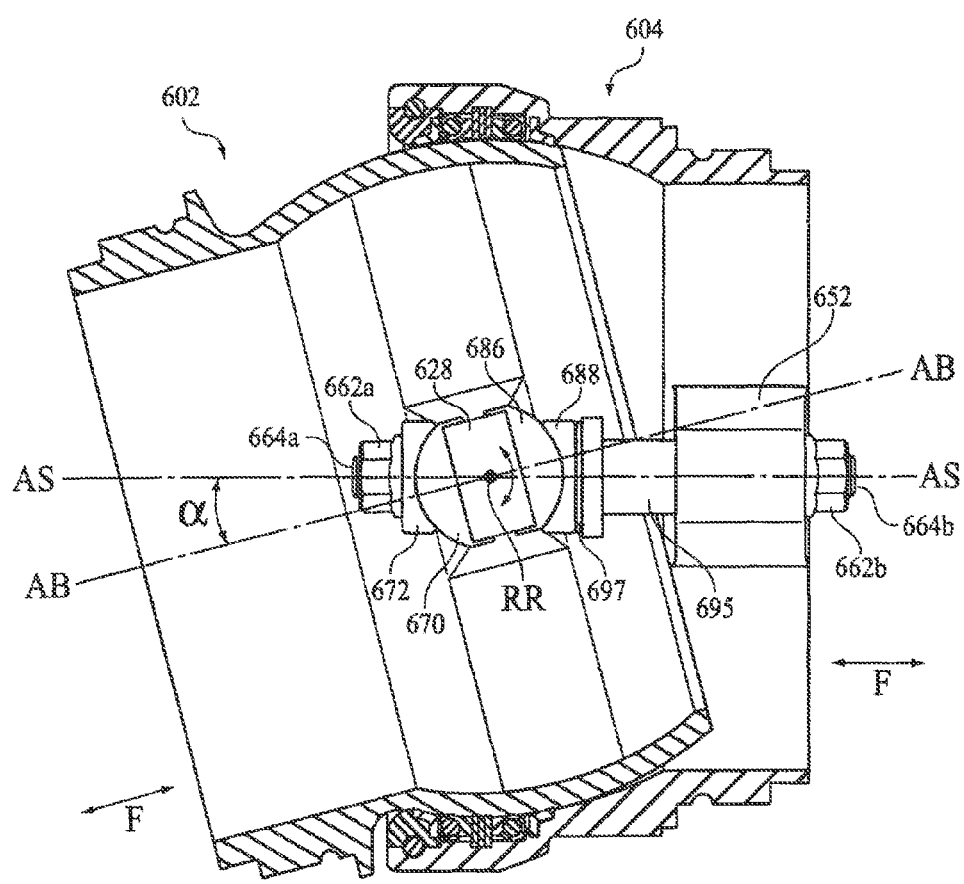
FIG. 7B illustrates a partially cut-away, perspective view of the ball and socket coupling 600 in its assembled state and in a deflected position, where the central longitudinal axis AB of the ball body 602 is oriented at an angle with respect to the central longitudinal axis AS of the socket body 604.

As shown in FIG. 7A, the mating convex and concave bearing surfaces 674, 678 are defined by a radius, the center point of which defines an axis of rotation RR of the ball body 602 relative to the socket body 604. The axis of rotation RR is perpendicular to the direction of fluid flow F within the ball and socket coupling 600. Due to the mating relationship of the convex and concave bearing surfaces 674, 678, the convex, partial cylindrical bearing surface 674 of each first bearing element 670 is permitted to rotate relative to the concave, partial cylindrical bearing surface 678 of each second bearing element 672, thereby permitting the ball body 602 to rotate relative to the socket body 604 about the axis of rotation RR. Moreover, due to the fact that the convex and concave bearing surfaces 674, 678 are partially cylindrical in shape, movement of the ball body 602 relative to the socket body 604 is constrained in directions other than about a single axis (i.e., the axis of rotation RR). Hence, the motion limiting structure 612 effectively forms a hinge joint between the ball body 602 relative to the socket body 604.

In an alternative embodiment (not shown), the first bearing element 670 of the motion limiting structure 612 may be omitted and replaced with a convex, partial cylindrical bearing surface formed in a respective ear 628 of the ball body 602. This alternative embodiment will effectively eliminate a component, namely the first bearing element 670. In another alternative embodiment (not shown), the motion limiting structure 612 may include a single bearing element (one per bolt and nut assembly) having a convex, partial cylindrical bearing surface (e.g., similar to the first bearing element 670) that is configured to mate with a concave, partial cylindrical bearing surface formed in a head of the bolt. This alternative embodiment will effectively eliminate a component, namely the second bearing element 672.

In an alternative embodiment (not shown), both the first and second bearing elements 670, 672 of the motion limiting structure 612 may be omitted and replaced with a convex, partial cylindrical bearing surface formed in a respective ear 628 of the ball body 602 that is configured to mate with a concave, partial cylindrical bearing surface formed in a head of the bolt. In this alternative embodiment, both the first and second bearing elements 670, 672 may be eliminated and the primary retaining structure 606, in cooperation with the ears 428 of the ball body 402, serves to: i) couple the ball body 602 to the socket body 604, ii) restrain relative axial movement between the ball body 602 and the socket body 604 along their respective longitudinal axes AB, AS and iii) limit relative motion between the ball body 602 and the socket body 604 to rotation about a single axis that is perpendicular to the direction of fluid flow F.

The ball and socket coupling 600 also includes a compressive load absorption structure 684 configured to absorb static or dynamic compressive loads that are generated by thermal changes, external vibration, and differential motion of the adjacent connected piping and support structures. The ball and socket coupling 600 is also capable of carrying torsion loads and prevents the ball body 602 from contacting the socket body 604. In the illustrated embodiment, the compressive load absorption structure 684 includes first and second bearing elements 686, 688 disposed between a respective ear 628 of the ball body 602 and a respective ear 652 of the socket body 604. In one embodiment, the first and second bearing elements 686, 688 are embodied as discrete bearings. In an alternative embodiment (not shown), each discrete bearing may be omitted and replaced with a convex, partial cylindrical bearing surface formed in a respective ear 628 of the ball body 602.

Each first bearing element 686 is formed with a convex, partial cylindrical bearing surface 690 and a bore 691 extending longitudinally therethrough and configured to receive the main shaft portion 666 of each bolt 660. The second bearing element 688 is formed with a concave, partial cylindrical bearing surface 692 and a bore 693 extending longitudinally therethrough and configured to receive the main shaft portion 666 of the bolt 660. The concave, partial cylindrical bearing surface 692 is sized and adapted to receive and engage the convex, partial cylindrical bearing surface 690 of each first bearing element 686. It will be appreciated that the bore 691 in each first bearing element 686 is sufficiently sized to provide enough clearance for the main shaft portion 666 of each bolt 660 to articulate therein during relative rotation of the ball body 602 and the socket body 604. To prevent each first bearing element 686 from rotating relative to the ball body 602, each first bearing element 686 includes a male-featured surface 694 (opposite the convex, partial cylindrical bearing surface 690) that interlocks with female features in a respective ear 628 of the ball body 602. Due to the mating relationship of the convex and concave bearing surfaces 690, 692, the convex, partial cylindrical bearing surface 690 of each first bearing element 686 is permitted to rotate relative to the concave, partial cylindrical bearing surface 692 of each second bearing element 688, thereby permitting the ball body 602 to rotate relative to the socket body 604 about the axis of rotation RR.

The compressive load absorption structure 684 further includes a pair of spacers 695, each of which is disposed between each second bearing element 688 and a respective ear 652 of the socket body 604. Each spacer 695 includes a bore 696 extending longitudinally therethrough and configured to receive the main shaft portion 666 of each bolt 660. Disposed between the spacer 695 and the second bearing element 688 is an annular-shaped, curved disc spring 697 to ensure electrical continuity between the ball body 602 and the socket body 604. In an alternative embodiment (not shown), the curved disc spring 697 and the spacer 695 can be replaced with a multi-coil helix compression spring to ensure electrical continuity between the ball body 602 and the socket body 604.

In an alternative embodiment, it will be appreciated that the primary retaining structure 606, the motion limiting structure 612, and the compressive load absorption structure 684 may be re-configured to be provided external to the ball and socket coupling 600. In other words, the primary retaining structure 606, the motion limiting structure 612, and the compressive load absorption structure 684 would not be in the path of fluid flow.

Unlike prior art ball and socket couplings, the ball and socket coupling 600 described above and illustrated in FIGS. 6 and 7A-7B is capable of limiting relative rotation between the ball body 602 and the socket body 604 about a single axis that is perpendicular to the direction of fluid flow F, while restraining relative rotation between the ball body 602 and the socket body 604 about their respective central longitudinal axes AB, AS and restraining relative axial movement between the ball body 602 and the socket body 604 along the direction of fluid flow F. Additionally, the ball and socket coupling 600 may also be designed with a smaller envelope size due to the motion limiting structure 612 being located within the coupling 600. Further, the ball and socket coupling 600 is capable of absorbing static or dynamic compressive loads. Moreover, the ball and socket coupling 600 is also capable of carrying increased torsion loads and preventing the ball body 602 from contacting the socket body 604.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A ball and socket coupling for conveying a fluid, the ball and socket coupling comprising:
    a ball body having a passage extending therethrough and a ball portion;
    a socket body having a channel extending therethrough and a ball receiving portion which receives the ball portion of the ball body;
    retaining structure disposed in the passage of the ball body and the channel of the socket body, and which operatively couples the ball body and the socket body together for permitting relative motion therebetween; and
    motion limiting structure associated with the retaining structure and which limits relative motion between the ball body and the socket body to rotation about a single axis that is perpendicular to the direction of fluid flow through the ball and socket coupling;
    wherein the ball portion includes an inner surface having a pair of opposing ears extending radially inward therefrom, each of which has a bore extending longitudinally therethrough,
    wherein the socket body extends along and about a central longitudinal socket body axis and includes a pipe portion, wherein the pipe portion includes an inner surface having a pair of opposing ears extending radially inward therefrom, each of which has a bore extending longitudinally therethrough that is coaxial with a respective bore in a respective ear of the ball body, and
    wherein the retaining structure includes a pair of bolt and nut assemblies each of which connects a respective ball body ear to a respective socket body ear.

2. The ball and socket coupling according to claim 1, wherein each bolt and nut assembly including a bolt having a head and a threaded shaft portion and a nut sized for threadable engagement with the threaded shaft portion.

3. The ball and socket coupling according to claim 2, wherein the motion limiting structure is disposed between the head of each bolt and the ball body ear, the motion limiting structure including a pair of bearing elements each of which is formed with a convex, partial cylindrical bearing surface and a concave, partial cylindrical bearing surface formed in a respective bolt head, the concave, partial cylindrical bearing surface sized and adapted to receive the convex, partial cylindrical bearing surface of a respective bearing element, wherein each bearing element is configured to interlock with a respective ball body ear to prevent relative rotation therebetween.

4. The ball and socket coupling according to claim 3, wherein the motion limiting structure is disposed between the head of each bolt and a respective ball body ear, the motion limiting structure including a first bearing element formed with a convex, partial cylindrical bearing surface and a second bearing element formed with a concave, partial cylindrical bearing surface sized and adapted to receive the convex, partial cylindrical bearing surface of the first bearing element, wherein each first bearing element is configured to interlock with a respective ball body ear to prevent relative rotation therebetween.

5. The ball and socket coupling according to claim 1, wherein each bolt and nut assembly including a bolt having a threaded shaft portion at each end and a pair of nuts each of which is sized for threadable engagement with each threaded shaft portion.

6. The ball and socket coupling according to claim 5, wherein the motion limiting structure is disposed between one of the nuts and the ball body ear, the motion limiting structure including a first bearing element formed with a convex, partial cylindrical bearing surface and a second bearing element formed with a concave, partial cylindrical bearing surface sized and adapted to receive the convex, partial cylindrical bearing surface of the first bearing element, wherein each first bearing element is configured to interlock with a respective ball body ear to prevent relative rotation therebetween.

7. The ball and socket coupling according to claim 6, further comprising a compressive load absorption structure disposed between a respective ball body ear and a respective socket body ear, the compressive load absorption structure including a first bearing element formed with a convex, partial cylindrical bearing surface and a second bearing element formed with a concave, partial cylindrical bearing surface sized and adapted to receive the convex, partial cylindrical bearing surface of the first bearing element, wherein each first bearing element is configured to interlock with a respective ball body ear to prevent relative rotation therebetween.

8. The ball and socket coupling according to claim 7, further comprising a pair of spacers, each of which is disposed between a respective second bearing element and a respective socket body ear, and a pair of curved disc springs, each of which is disposed between a respective spacer and a respective second bearing element.

9. A ball and socket coupling for conveying a fluid, the ball and socket coupling comprising:
- a ball body having a passage extending therethrough and a ball portion that includes an inner surface having a pair of opposing ears extending radially inward therefrom, each of which has a bore extending longitudinally therethrough;
- a socket body having a channel extending therethrough, a ball receiving portion which receives the ball portion of the ball body, and a pipe portion that includes an inner surface having a pair of opposing ears extending radially inward therefrom, each of which has a bore extending longitudinally therethrough;
- retaining structure which operatively couples the ball body ears and the socket body ears together for permitting relative motion between the ball body and the socket body; and
- motion limiting structure associated with the retaining structure and which limits relative motion between the ball body and the socket body to rotation about a single axis that is perpendicular to the direction of fluid flow through the ball and socket coupling;
- wherein the retaining structure includes a pair of bolt and nut assemblies each of which connects a respective ball body ear to a respective socket body ear.

10. The ball and socket coupling according to claim 9, wherein each bolt and nut assembly including a bolt having a threaded shaft portion at each end and a pair of nuts each of which is sized for threadable engagement with each threaded shaft portion.

11. The ball and socket coupling according to claim 10, wherein the motion limiting structure is disposed between one of the nuts and the ball body ear, the motion limiting structure including a first bearing element formed with a convex, partial cylindrical bearing surface and a second bearing element formed with a concave, partial cylindrical bearing surface sized and adapted to receive the convex, partial cylindrical bearing surface of the first bearing element, wherein each first bearing element is configured to interlock with a respective ball body ear to prevent relative rotation therebetween.

12. The ball and socket coupling according to claim 9, wherein each bolt and nut assembly including a bolt having a head and a threaded shaft portion and a nut sized for threadable engagement with the threaded shaft portion.

13. The ball and socket coupling according to claim 12, wherein the motion limiting structure is disposed between the head of each bolt and the ball body ear, the motion limiting structure including a pair of bearing elements each of which is formed with a convex, partial cylindrical bearing surface and a concave, partial cylindrical bearing surface formed in a respective bolt head, the concave, partial cylindrical bearing surface sized and adapted to receive the convex, partial cylindrical bearing surface of a respective bearing element, wherein each bearing element is configured to interlock with a respective ball body ear to prevent relative rotation therebetween.

* * * * *